Nov. 13, 1951           L. PERRAULT           2,574,706
SEGMENTAL COATING SHOE FOR PIPE AND THE LIKE
Filed Aug. 4, 1947
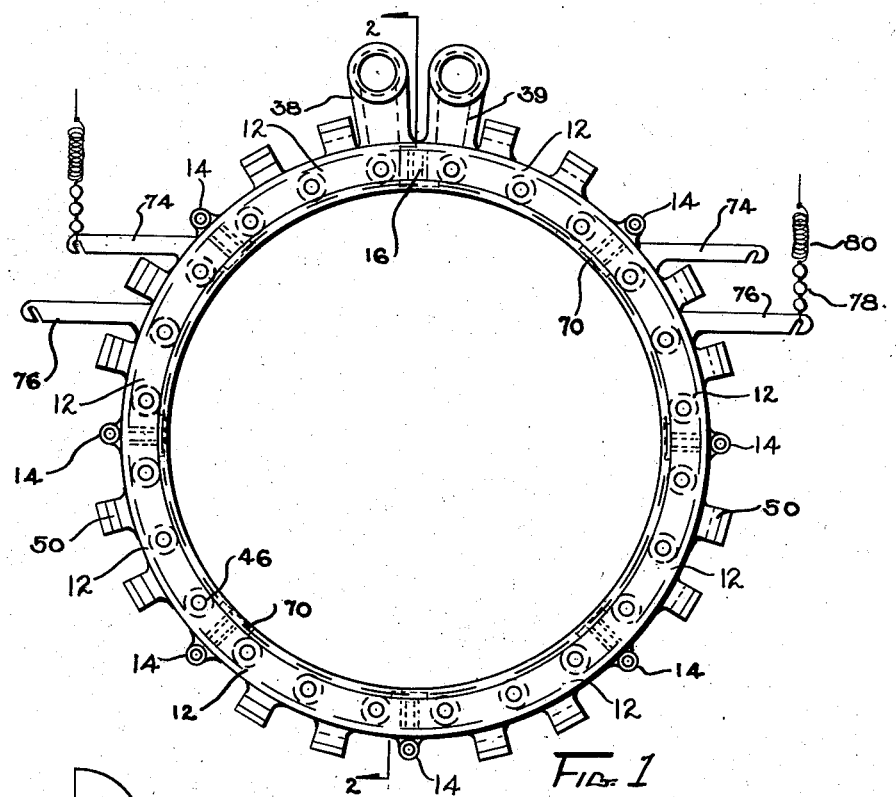
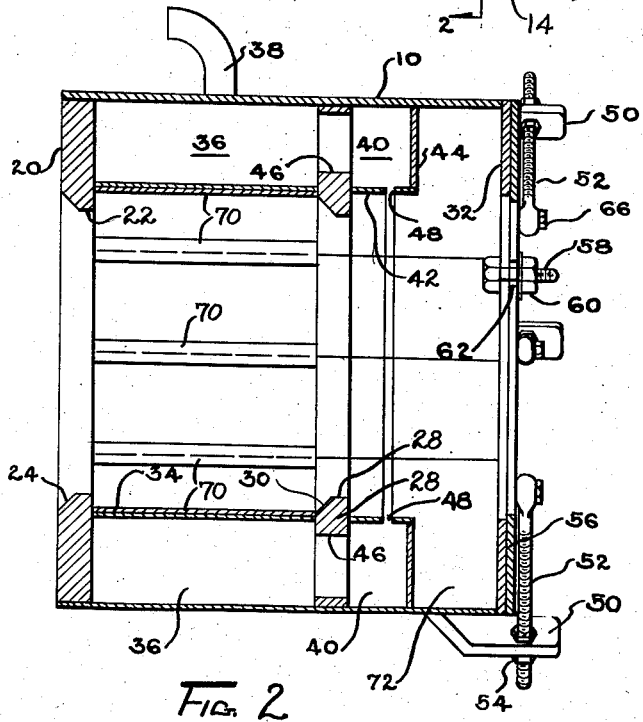
INVENTOR.
LEWIS PERRAULT
BY
C. M. McKnight
ATTORNEY Patented Nov. 13, 1951

2,574,706

UNITED STATES PATENT OFFICE 2,574,706

SEGMENTAL COATING SHOE FOR PIPE AND THE LIKE

Lewis Perrault, Tulsa, Okla., assignor to Perrault Bros., Tulsa, Okla., a partnership Application August 4, 1947, Serial No. 765,881

5 Claims. (Cl. 91—30)

This invention relates to a coating shoe for coating cylindrical bodies such as a pipe, tube or the like with a coating of bituminous or asphalt material. This application is a continuation in part of applicant's co-pending application Serial No. 653,640, filed March 11, 1946, now Patent No. 2,545,792.

The present invention relates generally to an improvement on the above mentioned application and particularly for an improved coating shoe that will modify the flow action from the gravity flow of the co-pending application to a pressure flow spraying the bitumen dope onto the pipe.

It is an important object of this invention to provide an apparatus adapted for use with a traveling coating machine for pipe lines and the like wherein the coating material is discharged under pressure against the entire circumferential surface of the pipe at one time and in the same plane.

And still another object of this invention is to provide a segmental coating shoe adapted for use with a traveling coating and wrapping machine for pipe lines, wherein the shoe sprays the coating material onto the pipe in a substantially annular path, and having adjustable plate members for maintaining a universal thickness of the sprayed coating material regardless of the variations in the contour of the pipe.

And still another object of this invention is to provide a coating shoe for a traveling coating and wrapping machine adapted to pressure spray coating material onto the pipe in order to cause flow of the material into crevices and cracks between the welds and collars of the pipe.

And still another object of this invention is to provide a flexibly mounted apparatus adapted to travel along a pipe having a plurality of guiding elements to prevent misalignment of the coating elements when traveling over a projection or high spot on the pipe, and which is automatically counterbalanced during its longitudinal travel to maintain proper alignment thereof.

Other objects and advantages of the invention will be evident from the following detailed description, read in conjunction with the accompanying drawings which illustrate my invention.

In the drawings:

Figure 1 is an end elevational view of the improved coating shoe with the adjusting plates omitted, and with certain parts shown in dotted lines for clarity.

Figure 2 is a sectional view taken on lines 2—2 of Figure 1, but including the adjusting plates and the means for adjusting.

Referring to the drawings in detail, the coating shoe generally indicated at 10 comprises a plurality of arcuately shaped segments 12 severed and hinged together through a plurality of hinge connections 14 to provide the segmental annular shoe 10. From Figure 1 it will be apparent that the hinge members 14 are provided in circumferentially spaced relationship to each other. The upper two sections 12 are placed together at 16, but are not provided with a hinge member for reasons that will be hereinafter shown. The segmental shoe is provided with a segmental front plate 20 having an aperture or gap 22 provided with a flared portion 24, and an intermediate segmental plate 26 having an aperture 28 with a flared portion 30. A segmental back plate 32 is provided to form the cylindrical body or housing 10 adapted to encircle a pipe (not shown). The shoe housing 10 is provided with a longitudinally disposed circumferential segmental baffle plate 34 extending between the plates 20 and 26 in order to provide a chamber 36. An inlet spigot or spout communicate with chamber 36 for discharging bitumen dope thereto from any suitable source such as a traveling coating machine (not shown). It will be apparent from Figure 1 that inlet spigot 38 communicates with one half of the annular shoe 10, while a similar spigot 39 directs coating material into the other semi-circular half portion of the shoe 10, for a purpose which will be hereinafter set forth. The annular plate 26 acts as a baffle between chamber 36 on one side of the plate 26 and another chamber 40 at the opposite side thereof. The annular plate 26 in conjunction with the annular plate 22 act as guide members for maintaining the shoe in proper balanced relation during its travel on the pipe. Furthermore, the plate 26 adds support to the shoe and provides a stronger and more rigid shoe throughout. However, in order to provide a passage to the pressure discharge slot 48, near the plate 26, the plate is provided with a plurality of apertures 46 so that the dope from the inlets 38 will flow into the secondary chamber 40. The chamber 40 is provided by the segmental plate members 42 and 44 disposed at right angles to each other, as shown in Figure 2. The annular plate 42 is provided with an annular slot 48, for a purpose as will be hereinafter set forth.

As clearly shown, the outer periphery of the annular shoe 10 is provided with a plurality of circumferentially spaced brackets 50, secured to the shoe by welding or the like, and extending or overhanging the cylinder 10. As shown in Figure 2, each of the brackets is apertured for receiving a stud bolt 52, co-operating with an adjusting nut 54, as will be hereinafter set forth. A plurality of arcuately shaped plates 56 are secured to the back plate 32 of the shoe 10 by studs 58 and nuts 60, with each stud extending through an elongated aperture 62 in the plate 56. It will be apparent that a locking and guide bolt 58 is provided for each plate 56 in a manner as previously disclosed in applicant's co-pending application above mentioned. The stud bolts 52 are preferably eye bolts which are secured to the plate 56 by a stud bolt 66. It will be noted from Figure 2 that the aperture 62 is of increased diameter and preferably elongated to allow for adjustment of the segmental plates 56 relative to the plates 32, and the outer diameter of the pipe to be coated (not shown). The adjustment is similar to that described in the applicant's co-pending application above mentioned, and is accomplished by loosening of the nut 60 on the stud 58 to permit movement of the segmental plate 56 toward and away from the outer periphery of the pipe in an amount variable with the elongation of the aperture 62.

As clearly shown in Figure 1, each of the segmental shoe portions are provided with a small plate 70 secured in any suitable manner to each of the segmental baffle plates 34 and adapted to be disposed in an overlapping relationship with an adjacent segmental plate at the opposite side of the hinge members 14, in order to prevent leakage or spilling of the bitumen dope from the annular chamber 36.

*Operation*

In operation, the coating material such as bitumen or the like flows from the inlet spouts 38 and 39 into the chamber 36 for each semicircular half portion of the segmental shoe 10, thereby providing an equal amount of the coating material in the annular chamber 36 at all times. As soon as the chamber 36 is filled with coating material and pressure builds up sufficiently, the material is permitted to discharge through the circumferentially spaced aperture 46 into the annular chamber 40, where it is discharged under pressure through the annular slot 48 and is sprayed in an annular path onto the pipe (not shown). Any surplus or extra deposit from the sprayed coating material will flow into the open chamber 72 provided by the plates 44 and 32, where it will be smoothed out and deposited onto the pipe in a uniform manner, depending on the adjustable position of the plates 56. It will be apparent that the pressure spraying of the coating material through the annular slot 48 will cause the flow of coating material into crevices and cracks of the pipe, which can not ordinarily be obtained in a gravity flow such as that disclosed in the applicant's above mentioned copending application.

The flared openings 24 and 30 facilitate movement of the coating shoe past any projections or high spots on the pipe. The coating shoe is provided with a plurality of horizontally spaced brackets 74 and 76 extending from diametrically opposite sides of the shoe 10, which are adapted to be secured to a chain 78 which is in turn secured to a helical spring 80 extending from the frame of the traveling coating and wrapping machine (not shown). In this manner, the shoe is flexibly mounted with respect to the pipe (not shown).

As the coating shoe is moved longitudinally along the pipe by the traveling machine (not shown), the dope is pressure sprayed from the annular slot 48 onto the outer periphery of the pipe, and the overflow of the sprayed coating material is applied to the pipe in a thickness determined by the adjustment of the plates 56. As long as the pipe is more or less level, variations in adjustment are unnecessary; however, in going uphill or downhill, around curves or bends, it is necessary to vary the position of the plates 49 in order to maintain a universal thickness for the overflow coating material, in a manner as previously described in the above mentioned co-pending application.

The chamber 36, in addition to acting as a pressure chamber for the inlet coating material, functions as a counter-balancing section to keep the coating shoe 10 in alignment during its travel along the pipe.

From the foregoing, it will be apparent that the number of arcuately shaped sections 12, and the adjustable plates 56 can be varied in accordance with the size of the pipe to be coated. In the present invention, there are eight arcuately shaped segments shown, but it is to be understood that the invention is not limited thereto, and any proportionate number may be utilized. The present segmental annular coating shoe provides a unitary coating apparatus which is flexibly mounted to allow automatic opening of the segment members upon encountering any high spots or protuberances in the pipe. Furthermore, the coating material is pressure sprayed onto the pipe in an annular path to assure a positive and efficient coating of the pipe as well as any cracks and crevices which may be present in the welds or collars of the pipe. In addition, the overflow of the sprayed coating material is uniformly applied to the pipe by the adjustable plate members, regardless of the variation in the contours of the pipe.

Changes may be made in the specifications and drawings without departing from the spirit of the invention within the scope of the following claims, as set forth.

What I claim is:

1. In a coating shoe comprising a plurality of arcuate sections hinged together in end to end relation forming an annular segmental housing adapted to encircle a pipe in spaced non-engaging relationship thereto, said housing comprising a plurality of baffled segmental compartments having communication therebetween, means for delivering coating material under pressure to said compartments, and annular slot means for discharging the coating material from said compartments onto the pipe and simultaneously over the entire surface thereof, an overflow recess in said housing adjacent the outlet means, an adjustable means adjacent the overflow chamber for maintaining a predetermined thickness of the coating material applied to the pipe.

2. A coating shoe for a pipe comprising a plurality of arcuately shaped hinged sections providing an annular segmental housing, an annular chamber provided in the housing, a coating material inlet communicating with the chamber, a segmental transverse baffle plate provided in the housing and extending through the chamber, a plurality of circumferentially spaced apertures provided in the baffle and providing communication through the chamber, an annular slot provided in the chamber and opening onto the pipe to provide for a spraying of the coating material flowing thereto in an annular path about the pipe, an overflow recess provided in the housing adjacent one end of the chamber, an adjustable means cooperating with the housing to pre-determine the thickness of the deposited coating material.

3. A pipe coating shoe comprising an annular segmental housing adapted to encircle the pipe and provided with a plurality of spaced annular shaped plate guide members for positioning the housing in non-engaging relationship with the pipe, an annular chamber provided in the housing, means for delivering coating material under pressure to the chamber, one of said guide members extending transversely through the chamber to provide additional support for the coating shoe, a plurality of circumferentially spaced apertures in the last mentioned guide member providing communication from one transverse end of the chamber to the opposite end, slotted means provided in the chamber for spraying the coating material discharged thereto onto the pipe, and adjustable means cooperating with the housing for varying the thickness of the coating material applied to the pipe.

4. A pipe coating shoe comprising an annular segmental housing adapted to encircle the pipe and provided with a plurality of horizontally spaced annular shaped plate guide members for positioning the housing in non-engaging relationship with the pipe, a segmental spaced transverse partition provided in the segmental housing and cooperating with one of the guide members to provide a chamber in the housing, means for delivering the coating material under pressure to the chamber, the other of said guide members extending transversely through the chamber to provide an additional support for the coating shoe, a plurality of circumferentially spaced apertures in the last mentioned guide member providing communication between opposite ends of the chamber, an annular slotted means provided in the chamber for spraying the coating material discharged thereto in an annular path about the pipe.

5. A pipe coating shoe comprising an annular segmental housing adapted to encircle the pipe and provided with a plurality of horizontally spaced annular shaped plate guide members for positioning the housing in non-engaging relationship with the pipe, a segmental spaced transverse partition provided in the segmental housing and cooperating with one of the guide members to provide a chamber in the housing, means for delivering the coating material under pressure to the chamber, the other of said guide members extending transversely through the chamber to provide an additional support for the coating shoe, a plurality of circumferentially spaced apertures in the last mentioned guide member providing communication between opposite ends of the chamber, an annular slotted means provided in the chamber for spraying the coating material discharged thereto in an annular path about the pipe, and adjustable means cooperating with the housing for varying the thickness of the coating material applied to the pipe.

LEWIS PERRAULT.

REFERENCES CITED

The following references are of record in the file of this patent:

UNITED STATES PATENTS

| Number | Name | Date |
| --- | --- | --- |
| 1,049,170 | Thomas | Dec. 31, 1912 |
| 1,682,823 | Barord | Sept. 4, 1928 |
| 1,727,929 | Berssenbrugge | Sept. 10, 1929 |
| 2,014,378 | Gardiner et al. | Sept. 17, 1935 |
| 2,305,005 | Henry | Dec. 15, 1942 |
| 2,340,325 | Horrigan | Feb. 1, 1944 |
| 2,482,021 | Mickelson | Sept. 13, 1949 |